United States Patent
Donner

(10) Patent No.: US 11,088,781 B2
(45) Date of Patent: Aug. 10, 2021

(54) METHOD AND SYSTEM FOR TESTING THE QUALITY OF A SIGNAL TRANSMISSION IN A COMMUNICATION SYSTEM

(71) Applicant: APTIV TECHNOLOGIES LIMITED, St. Michael (BB)

(72) Inventor: Olaf Donner, Harsum (DE)

(73) Assignee: APTIV TECHNOLOGIES LIMITED, St. Michael (BB)

(*) Notice: Subject to any disclaimer, the term of this patent is extended or adjusted under 35 U.S.C. 154(b) by 0 days.

(21) Appl. No.: 16/713,124

(22) Filed: Dec. 13, 2019

(65) Prior Publication Data
US 2020/0204297 A1    Jun. 25, 2020

(30) Foreign Application Priority Data
Dec. 19, 2018    (EP) .................................. 18214279

(51) Int. Cl.
*H04L 1/18*    (2006.01)
*H04L 1/00*    (2006.01)

(52) U.S. Cl.
CPC .......... *H04L 1/0047* (2013.01); *H04L 1/0006* (2013.01); *H04L 1/0026* (2013.01); *H04L 1/0061* (2013.01); *H04L 2001/0092* (2013.01)

(58) Field of Classification Search
None
See application file for complete search history.

(56) References Cited

U.S. PATENT DOCUMENTS

| 8,627,156 B1 | 1/2014 | Erickson |
| 2002/0168017 A1* | 11/2002 | Berthet .................. H04L 1/005 375/267 |

(Continued)

OTHER PUBLICATIONS

Extended European Search Report for Application No. EP 18 21 4279 dated Jun. 28, 2019.

*Primary Examiner* — Mujtaba M Chaudry
(74) *Attorney, Agent, or Firm* — Carlson, Gaskey & Olds

(57) ABSTRACT

A signal comprising a succession of first bit sequences $X_n$ is generated. Each $X_n$ with $n \geq 1$ is determined from the preceding $X_{n-1}$ using a deterministic algorithm P. The signal is transmitted from a transmitter through the communication system and received as a second bit sequence $X_n'$ by a receiver. For each received $X_n'$, the method comprises determining a first group of candidates $\{X_{n,i}\}_{i \in \mathbb{N}}$ corresponding to a plurality of possible first bit sequences $X_{n,i}$ that could have been sent from the transmitter device and changed into the second bit sequence $X_n'$ according to an acceptable modification in the communication system; determining a second group of candidates $\{Y_{n,j}\}_{j \in \mathbb{N}}$ from candidates determined for the preceding index n−1 and using P; determining a third group of candidates $\{X_{n-1,k}\}_{k \in \mathbb{N}}$ by intersecting the first group of candidates and the second group of candidates; checking the third group.

18 Claims, 4 Drawing Sheets

(56) References Cited

U.S. PATENT DOCUMENTS

| | | |
|---|---|---|
| 2006/0200708 A1 | 9/2006 | Gentieu et al. |
| 2008/0123749 A1* | 5/2008 | Bretillon ................ H04N 19/94 |
| | | 375/240.22 |
| 2012/0137016 A1* | 5/2012 | Hsu .................... H04N 21/2662 |
| | | 709/231 |
| 2013/0293725 A1* | 11/2013 | Zhang ................... H04N 17/02 |
| | | 348/180 |
| 2014/0143619 A1* | 5/2014 | Gorman ............... G11B 20/182 |
| | | 714/719 |
| 2017/0019247 A1 | 1/2017 | Iyer et al. |
| 2017/0078032 A1* | 3/2017 | Olgaard .............. H04W 52/242 |

* cited by examiner

METHOD AND SYSTEM FOR TESTING THE QUALITY OF A SIGNAL TRANSMISSION IN A COMMUNICATION SYSTEM

CROSS REFERENCE TO RELATED APPLICATION

This application claims priority to EP Application No. 18214279.4, filed on 19 Dec. 2018.

FIELD OF THE DISCLOSURE

The present disclosure relates to the field of testing the quality of a signal transmission through a communication system, network, architecture or the like, for example in an automotive audio architecture.

BACKGROUND OF THE DISCLOSURE

There are different known techniques for testing the quality of a digital signal transmission through a network, a communication system, architecture or the like.

A well-known technique consists in measuring a bit error rate (BER) during transmission and uses PRBS (Pseudo Random Binary Sequence), that are binary sequences that, while generated with a deterministic algorithm, are difficult to predict and have statistical behavior similar to truly random sequences, in order to evaluate transmission alterations through a network.

More precisely, on a transmitter device side, the pseudo-random binary sequences are generated using a source register such as a linear feedback shift register (LFSR). In practice, a sequence generating feedback polynomial, constituting a deterministic algorithm, operates on bits placed in a set of specific bit positions of the source register, called the "taps", in order to generate a new bit. Then, the source register shifts to the right, outputs the rightmost bit and the newly generated bit is fed back into the leftmost bit position which rank is "0".

The feedback polynomial is chosen according to the length of the source register so as to create a very long cycle (seemingly random) of bits before the source register returns to its initial state. For instance, for a 16 bit register, the maximal length feedback polynomial is "$x^{16}+x^{15}+x^{13}+x^4+1$", meaning a XOR operation on the 16th and 15th bits, then on the first result and 13rd bit, then on the second result and 4th bit, to generate the new bit.

On a receiver device side, a target register receives a first sequence of n bits sent by the source register, uses the same feedback polynomial to determine the subsequent state of the target register, as expected, thus predicts the next bit to be transmitted and compares the next received bit with the predicted bit.

The above method could also be used to compare bit sequences (for instance 16 bit sequences) instead of performing a bit to bit comparison to deal with a "sample by sample" transfer, as it is usual for audio systems. Samples in such system are "signed integer" representation of acoustical samples. Nevertheless, applying random bit sequence to such sample is a valid way of filling them.

Such method for testing a signal transmission allows to evaluate if the signal is correctly transmitted through the network on the basis of a bit to bit comparison. It is commonly used for testing electronical links.

However, such bit to bit error measurement is not adequate for testing the quality of the signal transmission in certain types of system or network, for example for testing digital sounds transmitted through an automotive audio architecture which typically includes several audio subsystems and their interfaces such as interfaces between different ICs (Integrated Circuit) and also interfaces between ECUs (Electronic Control Unit) in the vehicle like MOST (Media Oriented Systems Transport bus) or Ethernet AVB (Audio Video Bridging) from Head Units to Amplifiers. The subsystems and interfaces may create small variations in the transmitted audio samples, due for instance to rounding errors induces by type conversion in software in the various network nodes or small deviations caused by digital sample rate conversion methods that might apply to a given audio channel. These variations and deviations are random in their occurrence and importance, which means that they could randomly appear (or not) in the system or network over time and at a random degree of importance. But other than random bit errors anywhere in a sample, the nature of above mentioned tolerable error is to be a relatively small arithmetical difference of the real value of each sample. Furthermore, as bit samples of audio signals sent by the source register are altered through the system or network before arriving to the target register, the BER test is likely to fail.

However, even if audio channels in an automotive digital audio system may degrade a transported audio signal corresponding to an audio message, said audio message could still be rated as fully audible and not noticeably degraded, when it is played by a loudspeaker to a listener.

Being able to evaluate the quality of an audio transmission in a vehicle became crucial as audio messages highly impacts on the user automotive experience at various levels, from leisure to security.

Furthermore, obtaining information on the quality of audio signals transmitted through an audio system or network, such as an audio architecture of a vehicle, is needed in different situations:

at design and design validation time, simple quality check of audio distribution in automatable way (not dependent on proper speaker setup) on test benches;

when the audio system is manufactured, in order to guarantee an expected quality of the audio system, when the audio system is used (for example, when the vehicle is driven), for each emitted audio signal, to ensure that sensitive audio messages, like audio functional safety relevant messages, are correctly provided to the user(s) (for example, the vehicle occupant(s)).

SUMMARY OF THE DISCLOSURE

The present disclosure concerns a method for testing the quality of a signal transmission in a communication system, comprising generating a signal comprising a succession of first bit sequences $X_n$ with n=0, 1, 2, . . . , wherein each first bit sequence $X_n$ with n≥1 is determined from the preceding first bit sequence $X_{n-1}$ and using a deterministic algorithm P; sending the signal from a transmitter device to a receiver device through the communication system; for each first bit sequence $X_n$ of the signal transmitted through the communication system, receiving, by the receiver device, a second bit sequence $X_n'$; and, for each second bit sequence $X_n'$ with n≥1, determining a first group of candidates $\{X_{n,i}\}_{i \in \mathbb{N}}$ corresponding to a plurality of possible first bit sequences $X_{n,i}$ with i=0, 1, 2, . . . that could have been sent from the transmitter device and changed into the second bit sequence $X_n'$ according to an acceptable modification in the communication system, defined by a tolerated and expected error;

determining a second group of candidates $\{Y_{n,j}\}_{j\in\mathbb{N}}$ with j=0, 1, 2, ... from candidates $\{X_{n-1,k}\}_{k\in\mathbb{N}}$ determined from a preceding second bit sequence $X_{n-1}'$ and using the deterministic algorithm P; intersecting the first group of candidates $\{X_{n,i}\}_{i\in\mathbb{N}}$ and the second group of candidates $\{Y_{n,j}\}_{j\in\mathbb{N}}$, by determining the candidates that are present in both the first group of candidates $\{X_{n,i}\}_{i\in\mathbb{N}}$ and the second group of candidates $\{Y_{n,j}\}_{j\in\mathbb{N}}$, in order to determine a third group of candidates $\{X_{n,k}\}_{k\in\mathbb{N}}$; and checking said third group of candidates $\{X_{n,k}\}_{k\in\mathbb{N}}$ in order determine the quality of the signal transmission.

In an aspect of the present disclosure, in the step of checking g), when the number of candidates of the third group is equal to zero, it is determined that the quality of signal transmission is insufficient.

Advantageously, for index n with n≥2, in step e), the second group of candidates $\{Y_{n,j}\}_{j\in\mathbb{N}}$ with j=0, 1, 2, ... is determined from the candidates $\{X_{n-1,k}\}_{k\in\mathbb{N}}$ of the third group determined for index n−1 and using the deterministic algorithm P.

The signal may occupy all bit positions of a source register of the transmitter device.

Alternatively, the signal may occupy all bit positions of a source register of the transmitter device excluding a set of least significant bits of the source register. It allows to reduce the calculation effort but also the test coverage.

In an aspect of the present disclosure, the signal is injected in a main signal to be transmitted from the transmitter device to the receiver device through the communication system, and occupies a part of the bit positions of a source register of the transmitter device, the remaining bit positions of the source register being occupied by the main signal. Advantageously, each first bit sequence $X_n$ replaces a set of the least significant bits of the main signal in the source register.

Advantageously, the steps d) to g) are repeated as long as the third group of candidates includes at least one candidate.

Advantageously, if the third group includes at least one candidate when all second bit sequences of the signal have been received, it is determined that the quality of the signal transmission is good.

According to an aspect of the present disclosure, the first group of candidates $\{X_{n,i}\}_{i\in\mathbb{N}}$ determined according to a tolerance information that includes two limit values of tolerance, respectively minimal and maximal, and, for each second bit sequence $X_n'$, the minimal tolerance value and the maximal tolerance value are calculated from the decimal value of the second bit sequence $X_n'$.

The minimal limit value of tolerance can be equal to the decimal value of the second bit sequence $X_n'$ reduced by x % and the maximal limit value of tolerance can be equal to the decimal value of the second bit sequence $X_n'$ increased by x %, wherein x is comprised between 2 and 20, preferably between 5 and 15.

Alternatively, the minimal limit value of tolerance can be equal to the decimal value of the second bit sequence $X_n'$ reduced by a fixed amount τ and the maximal limit value of tolerance can be equal to the decimal value of the second bit sequence $X_n'$ increased by said fixed amount τ, wherein τ is comprised between 2 and 20, preferably between 5 and 15.

In an aspect of the present disclosure, the signal is an audio signal.

In an aspect of the present disclosure, in the step of checking g), when the third group has only one candidate, it is determined that the transmitter and the receiver are in sync.

Advantageously, after the transmitter and the receiver are determined to be in sync for index $n_0$, the method proceeds, for each of the next indices n, with n>$n_0$, with comparing the received second bit sequence $X_n'$ and a bit sequence generated from said one candidate and using the deterministic algorithm P in order to find a match.

When the transmitter and the receiver are in the "in sync" state, the method may transit into a mode of error counting. It means that the number of consecutive errors are counted like in a classical bit error tester.

Advantageously, when no match is found several consecutive times for a number of consecutive indices n, said number being superior to a predetermined value, it is determined that the transmitter and the receiver are out of sync.

The test method as previously defined can be applied to test the transmission of an audio signal in a vehicle architecture.

The test method can be applied during manufacturing of the vehicle and/or when the vehicle is used.

Another aspect of the present disclosure concerns a system for testing the quality of a signal transmission in a communication system, comprising a generation unit configured to generate a signal comprising a succession of first bit sequences $X_n$ with n=0, 1, 2, ..., wherein each bit sequence $X_n$ with n≥1 is determined from the preceding first bit sequence $X_{n-1}$ and using a deterministic algorithm P; a transmitter device for sending the signal through the communication system; a receiver device for receiving the signal and configured, for each first bit sequence $X_n$ transmitted through the communication system, to receive a second bit sequence $X_n'$; and a determining unit configured, for each of second bit sequences $X_n'$ with n≥1, to determine a first group of candidates $\{X_{n,i}\}_{i\in\mathbb{N}}$ corresponding to a plurality of possible first bit sequences $X_{n,i}$ with i=0, 1, 2, ... that could have been sent from the transmitter device and changed into the second test bit sequence $X_n'$ according to an acceptable modification in the communication system, defined by a tolerated and expected error; determine a second group of candidates $\{Y_{n,j}\}_{j\in\mathbb{N}}$ with j=0, 1, 2, ... from candidates $\{X_{n-1,k}\}_{k\in\mathbb{N}}$ determined from a preceding second bit sequence $X_{n-1}'$ and using the deterministic algorithm P; intersect the first group of candidates $\{X_{n,i}\}_{i\in\mathbb{N}}$ and the second group of candidates $\{Y_{n,j}\}_{j\in\mathbb{N}}$, by determining the candidates that are present in both the first group of candidates $\{X_{n,i}\}_{i\in\mathbb{N}}$ and the second group of candidates $\{Y_{n,j}\}_{j\in\mathbb{N}}$, in order to determine a third group of candidates $\{X_{n,k}\}_{k\in\mathbb{N}}$; and check the third group of candidates $\{X_{n,k}\}_{k\in\mathbb{N}}$ in order to determine the quality of the signal transmission.

Another aspect of the present disclosure concerns a receiver device comprising means for receiving a signal transmitted through a communication system, said signal comprising a succession of first bit sequences $X_n$ with n=0, 1, 2, ..., wherein each first bit sequence $X_n$ with n≥1 is determined from the preceding first bit sequence $X_{n-1}$ and using a deterministic algorithm P, and means for determining the quality of the signal transmission by performing steps d) to g) of the method previously defined for each of the received sequences $X_n$ with n≥1.

Another aspect of the present disclosure concerns a computer program comprising instructions which, when the program is executed by a computer, cause the computer to receive a signal transmitted through a communication system, said signal comprising a succession of first bit sequences $X_n$ with n=0, 1, 2, ..., wherein each first bit sequence $X_n$ with n≥1 is determined from the preceding first bit sequence $X_{n-1}$ and using a deterministic algorithm P, and means for determining the quality of the signal transmission by performing steps d) to g) of the method previously defined for each of the received sequences $X_n$ with n≥1.

Another aspect of the present disclosure concerns an audio test equipment integrating the system defined above, configured to test the audio quality of the architecture of a vehicle.

Another aspect of the present disclosure concerns a vehicle integrating the system defined above and/or the audio test equipment defined above.

BRIEF DESCRIPTION OF THE DRAWINGS

Other features, purposes and advantages of the present disclosure will become more explicit by means of reading the detailed statement of the non-restrictive embodiments made with reference to the accompanying drawings.

DETAILED DESCRIPTION OF THE DISCLOSURE

Before discussing example embodiments in more detail, it is noted that some example embodiments are described as processes or methods depicted as flowcharts. Although the flowcharts describe the operations as sequential processes, some of the operations may be performed in parallel, concurrently or simultaneously and the order of operations may be re-arranged. The processes may correspond to methods, functions, procedures, subroutines, subprograms, etc.

Specific structural and functional details disclosed herein are merely representative for purposes of describing example embodiments of the present disclosure. This present disclosure may, however, be embodied in many alternate forms and should not be construed as limited to only the embodiments set forth herein.

Below, details of the present disclosure will be further provided in combination with the accompanying drawings.

Figure 1:
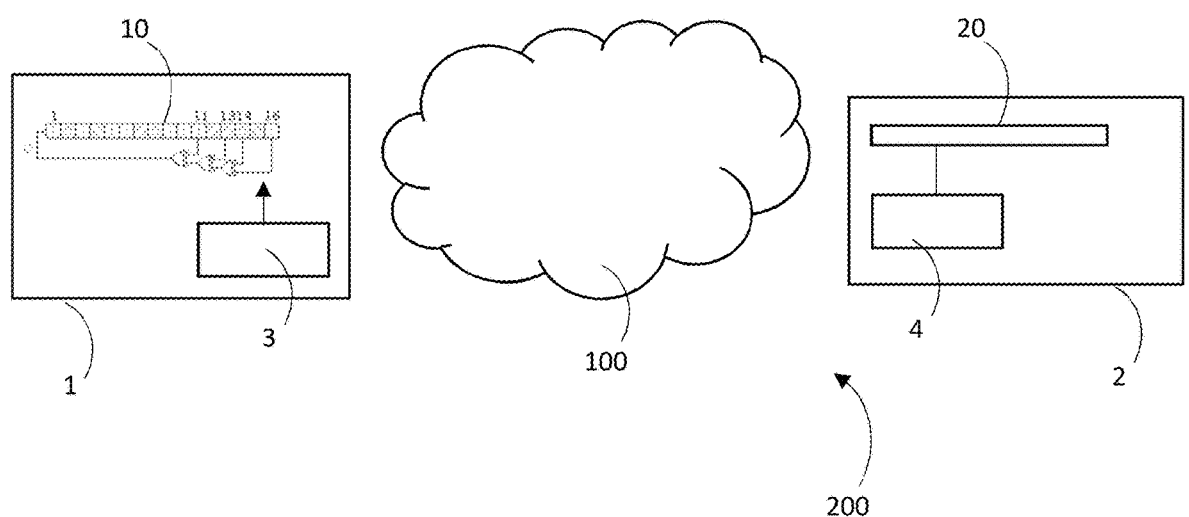
FIG. 1 shows a schematic diagram of a communication system or architecture or network 100 according to an exemplar embodiment of the present disclosure.

FIG. 1 shows a system 200 comprising a transmitter device 1, a communication system or architecture or network 100, and a receiver device 2, according to a first embodiment. For example, the system 200 as shown in FIG. 1 is implemented in a vehicle to transmit audio digital signals. In this example case, the communication system 100 is an automotive audio system or architecture.

The present disclosure is not limited to the transmission of audio digital signals but may be applied to the transmission of any other types of digital signals (image, video, text, etc.).

In the system 200 implemented in a vehicle, the transmitter device 1 is for example a sound processor and the receiver device 2 is for example a loudspeaker. The communication system 100 comprises one or more audio subsystems (for example, interfaces between different integrated circuits or electronic control units, network elements or nodes, etc.) and audio channels. The transmitter device 1 is configured to send an audio signal to the receiver device 2, the signal being divided into successive samples of L-bit length, for example in samples of 16-bit length. The audio signal composed of the L-bit audio samples is then transported through the communication system 100 and received by the receiver device 2. The transmission in the communication system 100 is likely to cause small variations in the audio samples and thus may impact the quality of the signal transmission.

The transmitter device 1 includes a source bit register 10. The receiver device includes a target bit register 20. The source register 10 and the target register 20 are both of L-bit length.

The communication system 100 includes a test system for testing the quality of signal transmission from the transmitter device 1 to the receiver device 2 through the communication system 100.

The test system comprises a generation unit 3 configured to generate a signal, noted $S_{test}$. The signal $S_{test}$ comprises a succession of first bit sequences or samples $X_n$ with n=0, 1, 2, .... The original bit sequence (or sample) $X_0$ is initially set. For example, it is a fixed value or a random value. $X_0$ is called a "seed" and must be different a sequence of only "0". Each bit sequence $X_n$ with n≥1 is determined from the preceding bit sequence $X_{n-1}$ and using a deterministic algorithm P. In other words, each bit sequence $X_n$ with n≥1 can be expressed as follows: $X_n = P(X_{n-1})$.

In the first example embodiment, the deterministic algorithm P is a PRBS (Pseudo Random Binary Sequence) algorithm. The generation unit 3 includes for example a LFSR (Linear Feedback Shift Register) comprising the source bit register 10 and a control unit 11. The control unit 11 is configured to control the generation of the first bit sequences $X_n$ with n=0, 1, 2, ... of the signal $S_{test}$ by the source register 10, according to a PRBS algorithm.

Any other deterministic algorithm may be used instead of PRBS.

The test system also comprises a determining unit 4 to determine the quality of the signal transmission. The determining unit 4 is provided on the reception side. It is integrated in the receiver device 2. Alternatively, the determining unit 4 may be implemented externally with respect to the receiver device 2 and connected to the receiver device 2. The operations and functions of the determining unit 4 will be described in more detail in the description of the test process for testing the quality of a signal transmission from the transmitter device 1 to the receiver device 2 through the communication system 100.

The generation unit 3 and the determining unit 4 may be functions implemented in a single processor or CPU (central processing unit). Alternatively, the generation unit 3 and the determining unit 4 are implemented in two different processors or CPUs.

The use of a deterministic algorithm P, such as PRBS, allows to:
- generate a succession of first bit sequences $X_n$ with n=0, 1, 2, . . . to be transmitted from the source register 10 to the target register 20, through the communication system (an audio system in the example embodiment) to be tested, and
- filter the received bit sequences, called hereinafter the "second bit sequences", so as to assess whether the quality of transmission is inside a tolerance band or not.

The source register 10 and the target register 20 are of length L, L being a number of bits. The value L corresponds preferably to the length (or number of bits) of signal samples, such as audio samples, to be transmitted. For example, L is equal to 16 bits. However, L may be equal to another value, preferably $2^P$ with p=2, 3, 4, 5 . . . .

The length of the bit sequences $X_n$ of the signal $S_{test}$ is m bits. Preferably, m L which means that, according to the embodiment, k=L or m<L, as described in the following description. In the first case (m=L), the signal $S_{test}$ occupies all bit positions of the source register 10. In the second case (m<L), the signal $S_{test}$ occupies a part of the bit positions of the source register 10.

In order to evaluate the quality of a signal transmission through the communication system 100, a tolerance information such as a tolerance band is defined. This tolerance information indicates the maximal amount of modifications or alterations that a digital signal sent from the source register 10 and transmitted through the communication system 100 to the receiver device 2 can undergo, so that the received signal can still be identified to the signal as originally sent when it is provided to a user (for example as an audio message).

A first embodiment of the test method or process will now be described in more detail in reference to FIG. 2.

The test method comprises a step S0 of generating a signal $S_{test}$ comprising a succession of first bit sequences $X_n$ with n=0, 1, 2, . . . , wherein each first bit sequence $X_n$ with n≥1 is determined from the preceding first bit sequence $X_{n-1}$ and using a deterministic algorithm P. In the present embodiment, the deterministic algorithm P is a pseudorandom binary sequence algorithm (PRBS). The bit sequences $X_n$ are generated from a seed bit sequence $S_0$ that is chosen randomly. Then, for n≥1, each first bit sequence $X_n$ can be expressed as follows: $X_n = P(X_{n-1})$.

In the first embodiment, the length m of each of the bit sequences $X_n$ with n=0, 1, 2, . . . , is equal to the length L of the source register 10. So, each first bit sequence $X_n$ occupies all bit positions of the source register 10.

Figure 3:
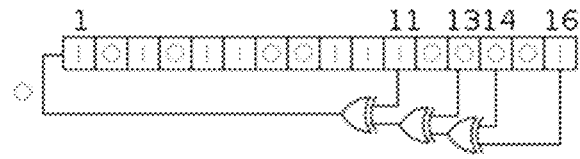
FIG. 3 shows an example of a bit register, more precisely a LFSR (Linear Feedback Shift Register).

In an illustrative example, given for the purpose of better understanding the first embodiment, the length L is 16 bits. The source register 10 is a 16-bit LFSR and the arrangement of bit positions that affect the next state of the register, also called the "taps", used for feedback in the LFSR, can be expressed as a polynomial of $x^{16}+x^{14}+x^{13}+x^{11}+1$ (wherein "1" is equivalent to $x^0$). The coefficients of the polynomial are "1" or "0". In this feedback polynomial as shown on FIG. 3, the taps are at the 16th, 14th, 13th and 11th bit positions.

The first bit sequences $X_n$ with n=0, 1, 2, . . . , are sent from the transmitter device 1, more precisely from the source register 10, to the receiver device 2 through the communication system 100, in a step S1.

On the reception side, the receiver device 2 receives second bit sequences $X_n'$, n=0, 1, 2, . . . , corresponding to the first bit sequences $X_n$ that may have been altered in the communication system 100 during transmission, in a step S2. In other words, for a first bit sequence $X_n$ of the signal sent by the transmitter device 1 and transmitted through the communication system 100, the receiver device 2 receives a second bit sequence $X_n'$.

At a level "0" (for n=0) of the test process, the transmitter device 1 generates and sends the first bit sequence $X_0$ (steps S0 and S1), or seed bit sequence $X_0$, and the receiver device 2 receives the second bit sequence $X_0'$ (step S2). Then, in a step S3, the determining unit 4 determines a first group of candidates $\{X_{0,i}\}_{i \in \mathbb{N}}$ corresponding to a plurality of possible first bit sequences $X_{0,i}$ with i=0, 1, 2, . . . that could have been sent from the transmitter device and changed into the second bit sequence $X_0'$ according to an acceptable modification in the communication system 100. The range of candidates depends on a tolerance information, as will be explained later in the description.

Such "acceptable" modification of the sequence or sample may be characterized by an arithmetic addition or subtraction of a tolerated and expected error, while a real error would be characterized by a totally unexpected value of a sample, for example because some higher significant bits of the sample have flipped or one or more samples have been deleted. At a level "1" (for n=1) of the test process, the transmitter device 1 generates and sends the first bit sequence $X_1$ (steps S0 and S1), the receiver device 2 receives the second bit sequence $X_1'$ (step S2) and then steps S4 to S6, explained below, are performed.

In step S4, the determining unit 4 determines a first group of candidates $\{X_{1,i}\}_{i \in \mathbb{N}}$ corresponding to a plurality of possible first bit sequences $X_{1,i}$ with i=0, 1, 2, . . . that could have been sent from the transmitter device and changed into the second bit sequence $X_1'$ according to an acceptable modification in the communication system 100. The range of candidates depends on a tolerance information that will be explained later in the description.

In addition, in step S5, the determining unit 4 determines a second group of candidates $\{Y_{1,i}\}_{j \in \mathbb{N}}$ with i=0, 1, 2, . . . from the group of candidates $\{X_{0,i}\}_{i \in \mathbb{N}}$ related to the second bit sequence $X_0'$ as received at level "0" and using the deterministic algorithm P. More precisely, the deterministic algorithm P is applied to each bit sequence $X_{0,i}$ of the group of candidates $\{X_{0,i}\}_{i \in \mathbb{N}}$ obtained at the preceding level "0" (for n=0) in order to determine the second group of candidates $\{Y_{1,i}\}_{j \in \mathbb{N}}$ of level "1" (n=1).

Then, in a subsequent step S6, the determining unit 4 determines a third group of candidates $\{X_{1,k}\}_{k \in \mathbb{N}}$ by intersecting the first group of candidates $\{X_{1,i}\}_{i \in \mathbb{N}}$ and the second group of candidates $\{Y_{1,i}\}_{j \in \mathbb{N}}$ determined in steps S4 and S5. In other words, the third group of candidates, or intersection group, includes the bit sequences that are present in both of the first group of candidates $\{X_{1,i}\}_{i \in \mathbb{N}}$ and the second group of candidates $\{Y_{1,i}\}_{j \in \mathbb{N}}$.

After step S6, the process goes to step S10 described later.

At each of the subsequent levels n with n≥2, for each second bit sequence $X_n'$ received by the receiver device 2, the following steps S7 to S9 are performed.

In step S7, the determining unit 4 determines a first group of candidates $\{X_{n,i}\}_{i \in \mathbb{N}}$ corresponding to a plurality of possible first bit sequences $X_{n,i}$ with i=0, 1, 2, . . . that could have been sent from the transmitter device and changed into the second bit sequence $X_n'$ according to an acceptable modification in the communication system. The range of candidates depends on a tolerance information that will be explained later.

In step S8, the determining unit 4 determines a second group of candidates $\{Y_{n,j}\}_{j \in \mathbb{N}}$ with j=0, 1, 2, . . . from the third group of candidates $\{X_{n-1,k}\}_{k \in \mathbb{N}}$, or intersection group, related to the preceding second bit sequence $X_{n-1}'$ (in other words, from the third group of candidates $\{X_{n-1,k}\}_{k \in \mathbb{N}}$ obtained at the preceding level "n−1" of the process) and using the deterministic algorithm P. The deterministic algorithm P is applied to each bit sequence $X_{n-1,k}$ of the group of candidates $\{X_{n-1,k}\}_{i \in \mathbb{N}}$ obtained at the preceding level "n−1" (for n=0) in order to determine the second group of candidates that is noted $\{Y_{n,j}\}_{j \in \mathbb{N}}$ of level "n".

Then, in step S9, the determining unit 4 determines a third group of candidates $\{X_{n,k}\}_{k \in \mathbb{N}}$ by obtaining an intersection between the first group of candidates $\{X_{n,i}\}_{i \in \mathbb{N}}$ and the second group of candidates $\{Y_{n,j}\}_{j \in \mathbb{N}}$. In other words, the determined candidates $\{X_{n,k}\}_{k \in \mathbb{N}}$ are the candidates that are present in both of the first group of candidates $\{X_{n,i}\}_{i \in \mathbb{N}}$ and the second group of candidates $\{Y_{n,j}\}_{j \in \mathbb{N}}$.

In a following step S10 (also executed at level "1" for n=1 after step S6), a test is executed to check the third group or intersection group determined in step S9 (or S3). In step S10, it is determined whether the current third group of candidates $\{X_{n,k}\}_{k \in \mathbb{N}}$ includes at least one candidate or not. In other words, it is determined whether the current third group, as determined in step S9 (or S6), is empty or not.

If the third group of candidates, or intersection group, for the current index n is empty ("Yes" branch on FIG. 2), the test process goes to a step S12 wherein it is determined that the quality of the signal transmission through the communication system 100 is insufficient. In step S12, the determining unit 4 can send a notification indicating that the quality of transmission is insufficient, for example to an external processor. A warning message indicating that the quality of the signal transmission through the communication system 100 is insufficient may be displayed to the user and/or provided to an operator, such as an operator of the manufacturer.

If the third group of candidates $\{X_{n,k}\}_{k \in \mathbb{N}}$, or intersection group, is not empty ("No" branch on FIG. 2), the test process goes to a next step S11, wherein it is checked whether a new second bit sequence $(X_{n+1}')$ has been received or not. The test can consist in checking whether the current index n is equal to the total number N or in checking the content of the target register. If a new second bit sequence $X'_{n+1}$ has been received ("Yes" branch on FIG. 2), the process goes back to step S7, the index n being increased by one ("n=n+1"), and repeats the steps S7 to S10 for the following index n+1.

If no more second bit sequence has been received (or n=N), the process goes to a step S13 wherein it is determined that the quality of the signal transmission is sufficient (or good). A notification can be sent to an external processor indicating the information of good quality.

Thus, the loop comprising steps S7 to S10 is repeated until one of the two following situations occurs:
  a. the current third group of candidates is empty (step S10, "Yes" branch);
  b. no new second bit sequence $X'_n$ is received (or index n reaches the maximal number N) with at least one candidate in the third group (step S11, branch "No").

In the first situation a) (the intersection group becomes empty on or before receiving the last second bit sequence $X_n'$ of the signal), the quality of signal transmission through the communication system 100 is determined as insufficient. In the second situation b), (a last second bit sequence $X_n'$ of the signal is received while there is at least one candidate in the intersection or third group), the quality of signal transmission through the communication system 100 is determined as sufficient or good.

The generation unit 3 is configured to perform step S0. The determining unit is configured to perform steps S3 to S13.

Figure 4:
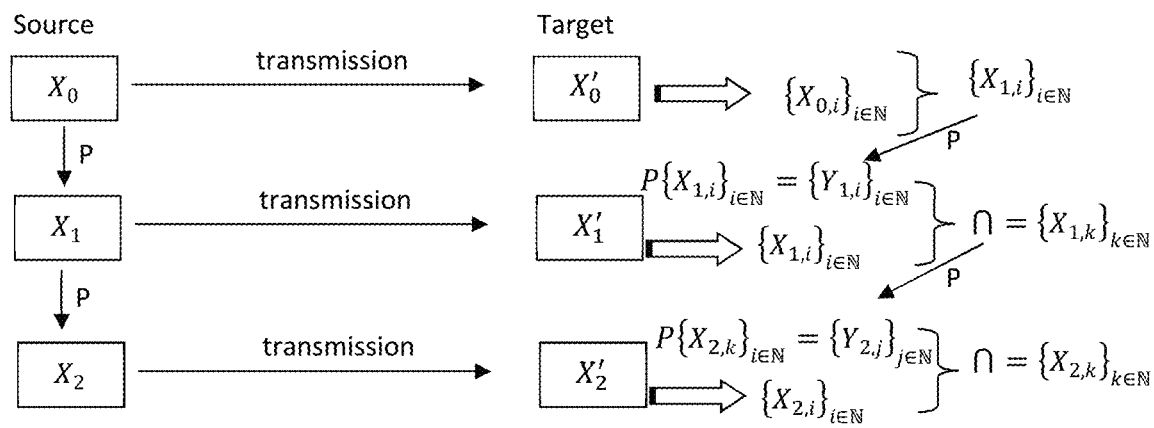
FIG. 4 shows a schematic representation of the test process, according to the first embodiment.

FIG. 4 shows a schematic representation of the process described above at levels n=0, n=1 and n=2.

The process is performed on a total number N of first bit sequences $X_n$, forming the signal $S_{test}$. The size or length of the signal $S_{test}$ is preferably chosen in a range of usual sizes of a signal transmitted from the transmitter device 1 to the receiver device 2 through the communication system 100. The size of the signal $S_{test}$ can be equal to the size of a reference signal. For example, the size of the signal $S_{test}$ is an average value of a plurality of signals usually transmitted from the transmitter device 1 to the receiver device 2. In case of an audio communication system or architecture 100 in a vehicle, the transmitter device 1 may be configured to transmit predefined audio messages, such as security messages or user instructions, of known time durations. The size of the signal $S_{test}$ can be set to represent an average value of the known time durations of the predefined audio messages (security, user instructions, etc.). The total number N (maximal value of index n) is calculated from the size of the signal $S_{test}$. For example, the audio message is a spoken phrase like "Please take control of the vehicle and grab the steering wheel again!". Such an audio message may have 5 second duration.

The tolerance information indicates a maximal amount of modifications or alterations that a digital signal sent from the source register 1 and transmitted through the communication system 100 to the receiver device 2 can undergo, so that the received signal can still be identified to the signal as originally sent. For example, in case of an audio signal carrying an audio message and transmitted through a communication system, a user listening the audio message played by a loudspeaker should be able to identify the original audio message as sent. The tolerance information can comprise a minimal tolerance value and a maximal tolerance value that define a tolerance band. For each second bit sequence $X_n'$ received by the receiver device 2, the minimal tolerance value and the maximal tolerance value are calculated from the decimal value of the second bit sequence $X_n'$. For example, the minimal limit value of tolerance $X_{n,min}'$ can be equal to the decimal value of the second bit sequence $X_n'$ reduced by x % and the maximal limit value of tolerance $X_{n,max}'$ can be equal to the decimal value of the second bit sequence $X_n'$ increased by x %, which can be expressed as follows:

$$X_{n,min}'=X_n'-x\%\cdot X_n'$$

$$X_{n,max}'=X_n'-x\%\cdot X_n'$$

The value x of percentage can be comprised between 2 and 20, preferably between 5 and 15. For example, x is equal to 10 and therefore:

$$X_{n,min}'=90\%\cdot X_n'$$

$$X_{n,min}'=110\%\cdot X_n'$$

Alternatively, the minimal limit value of tolerance $X_{n,min}'$ is equal to the decimal value of the second bit sequence $X_n'$ reduced by a fixed amount τ and the maximal limit value of tolerance $X_{n,max}'$ is equal to the decimal value of the second bit sequence $X_n'$ increased by said fixed amount τ. In other words:

$$X_{n,min}'=X_n'-\tau$$

$$X_{n,max}'=X_n'+\tau$$

The value of the fixed amount τ can be comprised between 2 and 20, preferably between 5 and 15. For example, τ is equal to 10 and $$X_{n,min}'=X_n'-10$$

$$X_{n,min}'=X_n'+10$$

In the first embodiment, the signal $S_{test}$ occupies all bit positions of the source register.

In a variant of the first embodiment, the signal $S_{test}$ occupies all bit positions of the source register excluding a set of least significant bits of the source register. In other words, a set of least significant bits (LSB) are excluded from the test. Thanks to that, the calculation effort of the test is reduced. The calculation time duration is reduced, which allows to reduce test time duration and/or use a smaller processor (CPU) to execute the test.

In case the deterministic algorithm is a bijection (which is the case for a feedback polynomial), it is possible, starting from a third group of candidates at any stage, to determine all the possible successive bit sequences that have been sent to generate the third group of candidates and the deviations they went through.

The test method is realized in a distributed computing environment. The present disclosure concerns the distributed system including the transmitter device 1 and the receiver device 2 and each entity of the distributed system, i.e. the transmitter device 1 and the receiver device 2.

Furthermore, the test method is advantageously implemented by a first computer, on the transmitter side, and by a second computer, on the receiver side. Therefore, the present disclosure also concerns:
 a computer program comprising instructions which, when the program is executed by the first computer, cause the first computer to generate a signal by performing step S0 and to transmit the signal to the second computer;
 a computer program comprising instructions which, when the program is executed by the second computer, cause the second computer to receive the signal and to determine whether the quality of the transmission by performing steps S3 to S13.

A second embodiment is based on the first embodiment and differs from the first embodiment only by the features described hereinafter.

In the second embodiment, the signal $S_{test}$ is inserted in a main signal $S_m$. In case of an audio communication system or architecture of a vehicle, the main signal can be an audio signal carrying an audio message, such as a security message or a user instruction, to be played to the user.

The signal $S_{test}$ is injected in the main signal $S_m$ to be transmitted from the transmitter device 1 to the receiver device 2 through the communication system 100.

The signal $S_{test}$ comprises a succession of first bit sequences $X_n$ with n=0, 1, 2, . . . , as previously described. The length m of each of the first bit sequences $X_n$ is strictly inferior to the length L of the source register and/or the samples of the main signal $S_m$. The signal $S_{test}$ occupies a part of the bit positions of the source register 10, the remaining bit positions of the source register 10 being occupied by the main signal $S_m$. More precisely, m bit positions of the source register 10 are occupied by a first bit sequence $X_n$ of the signal $S_{test}$ and the L−m remaining bit positions are occupied by bits of a sample of the main signal $S_m$.

Advantageously, each first bit sequence $X_n$ replaces a set of q least significant bits of the main signal $S_m$ in the source register 10. In order words, in the source register 10, or in each sample of length L of the main signal $S_m$, a set of least significant bits of the main signal $S_m$ are deleted and replaced by a first bit sequence $X_n$ of the signal $S_{test}$. For instance, the first bit sequence $X_n$ replaces the five least significant bits of the source register 10.

The deterministic algorithm p is applied only to bits of the signal $S_{test}$ in the source register 10.

In the second embodiment, the injection of the signal in the main signal is introduces test bit sequences in the main signal. The modification of the main signal is adapted to be assimilated to a white noise that can hardly be perceived by a user (a listener in case of audio signals). This is achieved by all or part of the following features:
 The deterministic algorithm P is a PRBS algorithm. Such algorithm generates random sequences of bits, which, by their random nature, can be assimilated to white noise by users (e.g. listeners).
 The bits of the signal $S_{test}$ occupy only a small fraction of the source and target registers, preferably a part A including the LSB (least significant bits), for instance the five LSB, so that users (e.g. listeners) hardly perceived the part A and could mistake it for small noise floor.
 The main signal (e.g. the useful audio message) occupies the other part of the source and target registers. So, for each bit sequence sent from the source register 10, some of the LSB are used for the test process and the other bits are for the main signal itself.

A third embodiment will now be described with reference to FIG. 5. It is based on either the first embodiment or the second embodiment and only differs from these embodiments by the features described hereinafter. The third embodiment allows to determine if the transmitter and the receiver are in sync or out of sync (or in a "sync loss" state).

According to the third embodiment, steps S0 to S9 are performed, as will be explained now. The checking step S10 is also executed and, in step S10, it is checked whether the third group has only one candidate or not. If the third group includes only one candidate, it is determined that the transmitter and the receiver are in sync. It means that the receiver receives the bit sequence or sample as sent by the transmitter, without modification. Consequently, the quality of transmission is considered as very good.

Then, after the transmitter 1 and the receiver 2 are determined to be in a "in sync" state, for example at index no, the method proceeds, for each of the next indices n with n>$n_0$, with comparing the received second bit sequence or sample $X_n'$ and a bit sequence or sample generated from said one candidate and using the deterministic algorithm P, in order to find a match. When no match is found X times for X consecutive indices n, X being superior to a predetermined limit value (for example 1, 2 or more), it is determined that the transmitter 1 and the receiver 2 are out of sync or in a state "sync loss". In that case, the method returns to the beginning (step S0) and starts again. The predetermined limit value may be comprised between 1 and 100, preferably between 1 and 50, more preferably between 5 and 20, for example the limit value is equal to 10.

The third embodiment may be executed in combination with the first or the second embodiment or alone, independently of the first or second embodiment.

Figure 5:
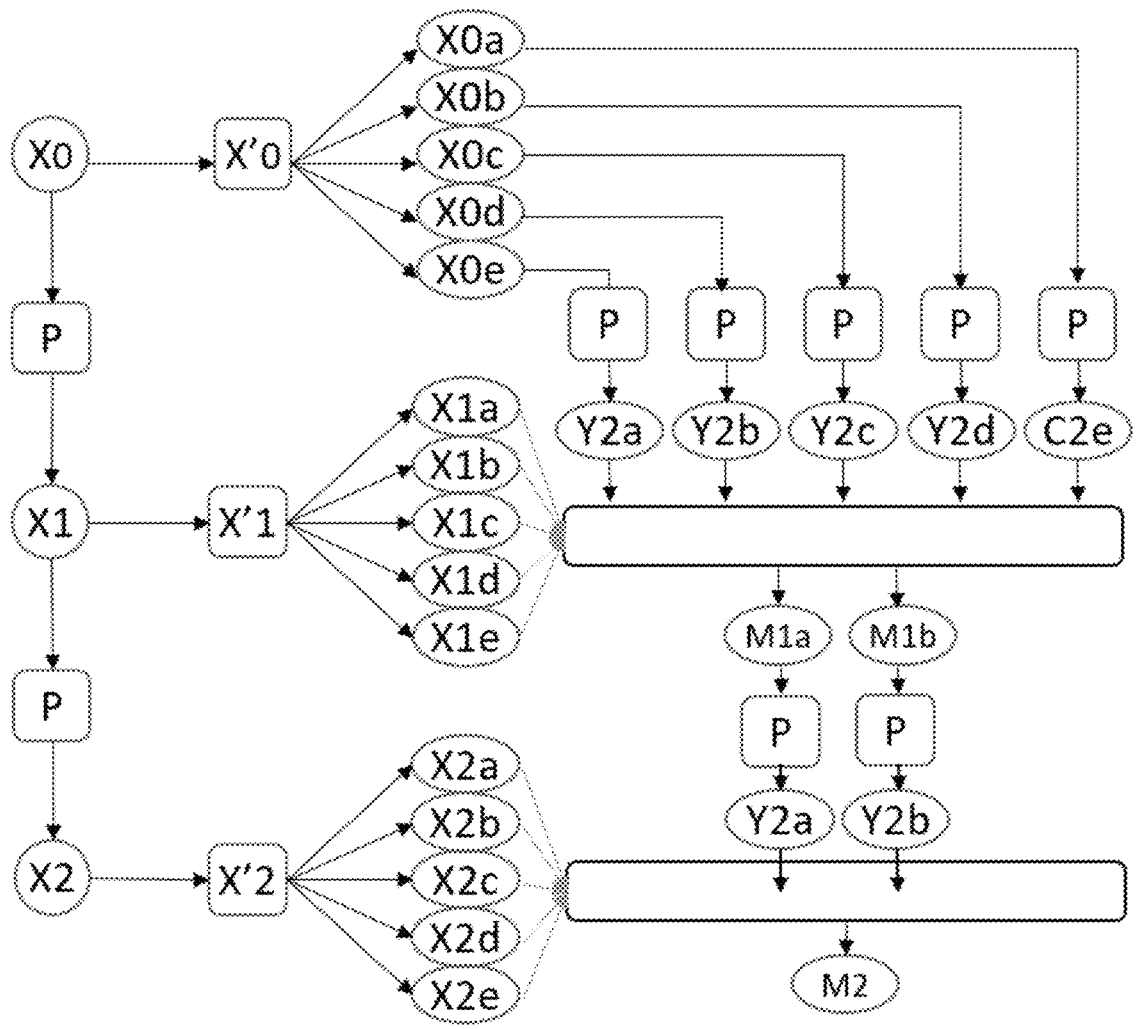
FIG. 5 represents an example related to a second embodiment.

FIG. 5 represents an exemplary diagram that allows to illustrate the third embodiment. $X_0$, $X_1$ and $X_2$ on the left of the diagram are three samples or sequences, generated by the transmitter 1. For example, each sequence includes 16 bits. $X_1$ is built by applying the deterministic algorithm P to $X_0$ as a start condition or seed. The transmitter 1 then continues by generating $X_2$, $X_3$, $X_4$ in the same manner.

The transmitter 1 sends $X_0$ to the receiver 2, through the communication system 100. The sequence $X_0$ is assumed to suffer a tolerable error during its transmission through the communication system 100. The receiver 2 receive the sample $X'_0$. When the transmitter 1 and the receiver 2 are out of sync, the receiver 2 has no history data. It only has the definition of the deterministic algorithm P and the assumption of a tolerable error due to transmission in the communication system 100. So, when the sequence $X'_0$ is received, the receiver 2 can only assume to have gotten either the 16 valid bits of the sequence $X_0$ as sent, or an arithmetic deviation to that 16 Bit sequence $X_0$, that is considered as a tolerable error. This makes up a field of potential sent sequences. For example (only for a purpose of illustrating the third embodiment), the potential sent sequences are five and noted $X_{0a}$, $X_{0b}$, $X_{0c}$, $X_{0d}$ and $X_{0e}$ on FIG. 5. Let's assume that the decimal value of $X_0$ is "50" and a tolerance band is "2", then the decimal values of $X_{0a}$, $X_{0b}$, $X_{0c}$, $X_{0d}$ and $X_{0e}$ are 48, 49, 50, 51 and 52. For example, the transmitter 1 could have sent 49 and it could have been received as 48. The transmitter could as well have sent 50, and it could have been received as 49. The receiver 2 cannot know.

As the receiver 2 has no more information at this moment, it generates a next candidate $Y_{0a}$, $Y_{0b}$, $Y_{0c}$, $Y_{0d}$ and $Y_{0e}$ for each of the potential sent sequences or samples $X_{0a}$, $X_{0b}$, $X_{0c}$, $X_{0d}$ and $X_{0e}$ by applying the deterministic algorithm P (step S5).

Then, the next sequence $X_1$ (generated from $X_0$ by applying the algorithm P) is sent by the transmitter 1. Again, the receiver 2 assumes a tolerable error of transmission and will build up the potential sent sequences potential sent sequences or samples $X_{1a}$, $X_{1b}$, $X_{1c}$, $X_{1d}$ and $X_{1e}$. But now, the receiver 2 is in a "synchronizing" process, as it has already historical data of previous sample or sequence. The receiver 2 compares $X_{1a}$, $X_{1b}$, $X_{1c}$, $X_{1d}$ and $X_{1e}$ with $Y_{0a}$, $Y_{0b}$, $Y_{0c}$, $Y_{0d}$ and $Y_{0e}$ (step S6). It identifies all matches (there can be more than one match) and saves them. In the present example illustrated on FIG. 5, there are two matches: $M_{1a}$, $M_{1b}$.

Then, again, the algorithm P is applied to generate two candidates $Y_{2a}$ and $Y_{2b}$ for the next expected sample or sequence (step S8).

The transmitter 1 then sends the next sample or sequence $X_2$ and, after transmission through the communication system, the receiver 2 receives the sample $X'_2$. When this next sample or sequence $X'_2$ is received, all the potential sent variations $X_{2a}$, $X_{2b}$, $X_{2c}$, $X_{2d}$ and $X_{2e}$ of the sent sample $X_2$ are generated by the receiver 2 (step S7). Then, the receiver 2 compares the two candidates $Y_{2a}$ and $Y_{2b}$ and $X_{2a}$, $X_{2b}$, $X_{2c}$, $X_{2d}$ and $X_{2e}$.

In the present example, it is determined that now only one match $M_2$ is found (in the checking step S10). It means that the alignment of the PRBS sequence between transmitter and receiver is perfect. Consequently, it is determined that the receiver 2 and the transmitter 1 are in sync.

From this stage of the process, there is no need to further investigate more candidates. It means that the receiver 2 no longer generates several candidates when it receives a new sample or sequence.

The receiver may alternatively simply generate a next one candidate from the single previous one using the deterministic algorithm P and compare it to the next received sample.

In case the comparison provides a match, it is determined that the receiver 2 and the transmitter 1 remain a state "in sync".

In case the comparison no longer provides a match, which means that the received sample is different from the one candidate generated from the previous one using the algorithm P, it is determined that the received sample includes an error, called a "sample error". An error counter is then started to count the number of consecutive errors or "sample errors". Anyhow, the receiver 2 uses the one candidate to generate a new expected sample for next sample to be received. When the next sample is received, both samples (expected sample that has been generated from the one candidate and the received sample) are compared. If a match is found, the counter is stopped and the receiver 2 and the transmitter 1 are determined to be in sync again. If no match is found, the counter is increased by one.

Thus, as long as the transmitter 1 and the receiver 2 are in the "in sync" state, the receiver may transit into a mode of error counting. It means that the receiver may count the number of consecutive errors like a classical bit error tester.

A limit value of consecutive sample errors may be predefined. If the amount of consecutive errors in the counter reaches this limit value, it may be determined or detected that the transmitter 1 and the receiver 2 are out of sync or in a state of "sync loss". This limit value may be equal to only one or more than one. As previously indicated, the predetermined limit value may be comprised between 1 and 100, preferably between 1 and 50, more preferably between 5 and 20, for example the limit value is equal to 10.

Figure 2:
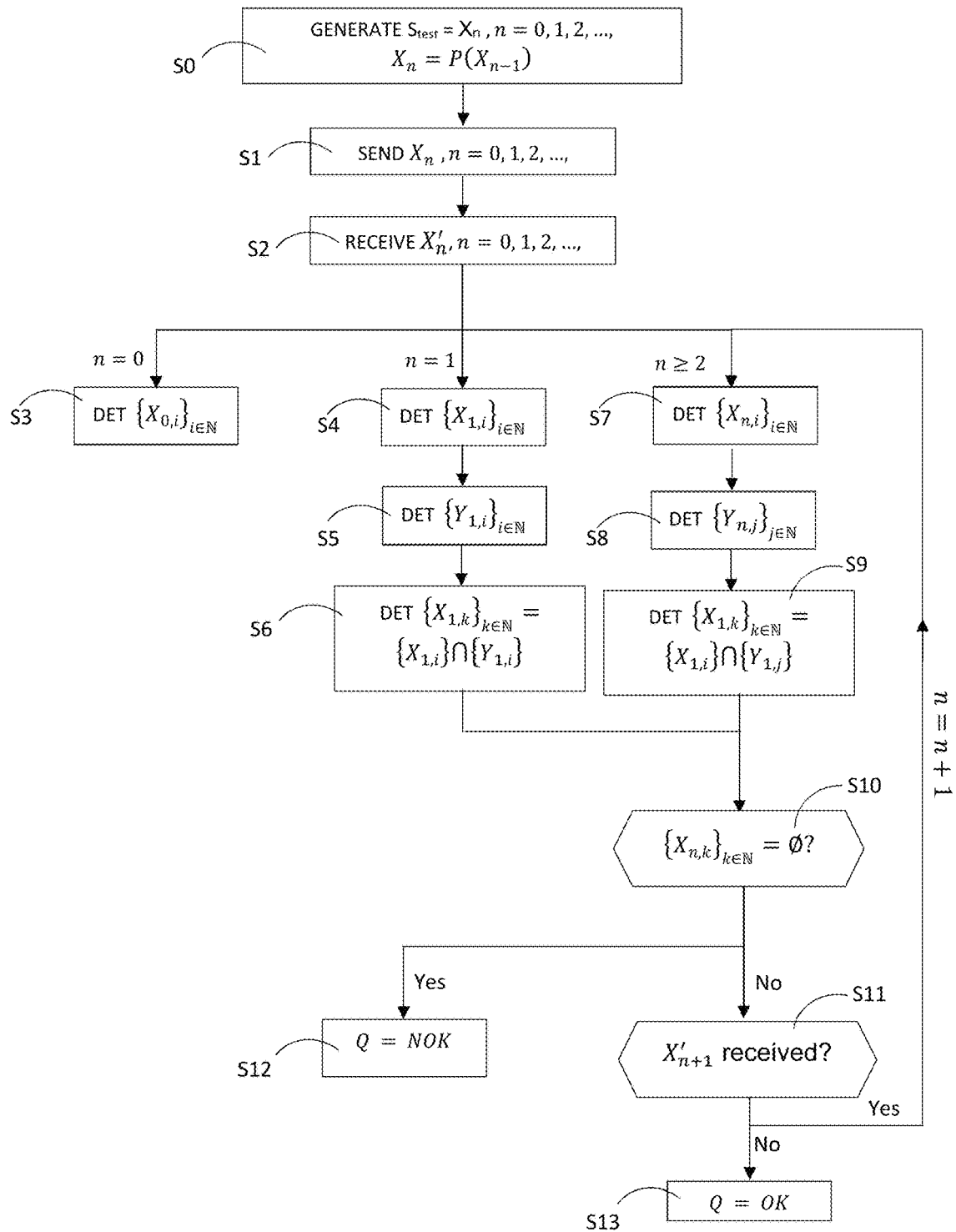
FIG. 2 shows a flowchart representing a test method or process for testing the quality of a signal transmission through the communication system of FIG. 1, according to a first embodiment.

Then, the receiver 2 returns to the first step of the process, at the beginning of the diagram of FIG. 5 (or step S0 of FIG. 2). The process is executed from the beginning again in order to search for a "in sync" state of the transmitter and the receiver.

Alternatively, after finding no match of the single candidate, the receiver 2 could right away determine that the transmitter and the receiver are out of sync and return to the first step of the process.

As described above, the third embodiment executes steps S1 to S10 shown in FIG. 2. In the checking step S10, it is checked whether the third group of candidates includes only one candidate. If so, the method stops determining a group of several candidates when a new sample or second bit sequence is received and proceeds with comparing the received second bit sequence $X_n'$ and a bit sequence generated from the one candidate and using the deterministic algorithm P, in order to find a match. As long as a match is found, the transmitter and the receiver are detected to be in sync. When no match is found several consecutive times, for a number of consecutive indices n superior to a predetermined value, it is determined that the transmitter and the receiver are out of sync. However, it may be determined that the transmitter and the receiver are out of sync as soon as no match is found once.

The receiver 2 includes a target bit register 20 and a determining unit 4 configured to execute the third embodiment as described above.

On the receiver side, the third embodiment may be implemented by a computer program comprising instructions which, when the program is executed by a computer, cause the computer to receive a signal transmitted through the communication system 100, said signal comprising a succession of first bit sequences $X_n$ with n=0, 1, 2, . . . , wherein each first bit sequence $X_n$ with n≥1 is determined from the preceding first bit sequence $X_{n-1}$ and using a deterministic algorithm P, and means for determining whether the transmitter 1 and the received 2 are in sync, as described above.

The present disclosure is suitable to be integrated in a test equipment and could be applied to check the overall transmission quality of a communication system or network during manufacturing.

The first embodiment is suitable to be applied to check the quality of a transmission system during or at the end of manufacturing.

The second embodiment is suitable to be applied to check the quality of a communication system in use (e.g. when a vehicle including the audio architecture is driven).

The test method is able to classify the quality or "clearness" of a given audio channel for the reasons explained below.

The test process can show the deviations that samples had undergone, in case there is only one candidate left in the third group of candidates and if the deterministic P is a bijection. The test process can also provide a probabilistic distribution of these deviations, in case there are several candidates left in the third group of candidates or if P is not a bijection).

Furthermore, the test method can provide the count of errors which has been beyond the accepted tolerance (the number of times there is no more candidates in a third group of candidates).

The test method can also indicate events of sync loss (loss of synchronization), for instance due to dropped audio buffers, when the third group of candidates reaches no candidate left.

In case the communication system comprises a mixing device between the source register and the target register, which mixes and/or combines bit sequences coming from different sources including the source register, such mixing device should not change the part A occupied by the test bits used for testing the quality. In other words, the mixing device should act as a "bit mask" mixer for part A.

The way of testing of the present disclosure is in particular suited to catch some problems that are coming from the nature of digital signal handling, in particular:

rounding problem from variable type conversion (floating point to fixed point along the processing and transmission chain);

unawareness of implicit sample rate conversion (e.g. in the SW stack of Linux ALSA architecture, where without obvious reason a sample rate conversion might have happened, for instance from a 48 kHz source to 44.1 kHz of a sound card output in one ECU and a back conversion to 48 kHz in the other ECU);

problem of lost sample groups (buffers), for instance when somewhere in the processing and transmitting chain, due to lack of processing power, underrun situations (buffer fed at a lower speed than it is being read) occurred.

The test method uses the fact that the first bit sequences $X_n$ with n=0, 1, 2, . . . are pseudorandom bit sequences that seem random but can each be determined from a preceding first bit sequence. These first bit sequences can be assimilated to white noise by users (e.g. listeners for audio signals). A PRBS signal replaces the least significant bits (LSB) of the main signal, creating some little, not disturbing noise floor, and the indicated method is used on the PRBS to check whether the LSB, and so the main signal, are inside a defined a tolerance band or not.

The present disclosure allows to estimate the clearness and quality of a digital transport network as well as to assess the quality of transmitted signals distributed on such network.

The quality of the audio channel (real deviation, number of errors etc.) can also be evaluated by the present disclosure.

The present disclosure can also be used to detect and prove the playback of an audio stream even when such audio stream is mixed with other audio signals.

The present disclosure also concerns:

an audio test equipment integrating the test system previously described, configured to test the audio quality of the architecture of a vehicle, and a vehicle integrating the described system or the above audio test equipment.

The invention claimed is:

1. A method for testing a quality of a signal transmission in a communication system, the method comprising:
   a) generating a signal comprising an initial bit sequence $X_0$ and a succession of bit sequences $X_n$ wherein n=1, 2, . . . , wherein each bit sequence $X_n$ with n≥1 is determined by applying a deterministic algorithm P to a preceding bit sequence $X_{n-1}$ of the signal;
   b) sending the signal from a transmitter device to a receiver device through the communication system;
   c) receiving, by the receiver device, a succession of received bit sequences $X_n'$ wherein n=0, 1, 2, . . . , and wherein each received bit sequence $X_n'$ corresponds to each bit sequence $X_n$ of the signal transmitted through the communication system;
   d) determining a first group of candidates $\{X_{n,i}\}_{i \in N}$ for each received bit sequence $X_n'$ with n≥1, wherein each first group of candidates corresponds to a plurality of possible sent bit sequences $X_{n,i}$ with i=0, 1, 2, . . . modified by a signal modification in the communication system defined by a tolerated and expected error;
   e) determining a second group of candidates $\{Y_{n,j}\}_{j \in N}$ for each received bit sequence $X_n'$ with n≥1 and j=0, 1, 2, by applying the deterministic algorithm P to the first group off candidates $\{X_{n-1,k}\}_{k \in N}$ determined from the first group of candidates for a preceding received bit sequence $X_{n-1}'$;
   f) determining a third group of candidates $\{X_{n,k}\}_{k \in N}$ by intersecting the first group of candidates $\{X_{n,i}\}_{i \in N}$ and the second group of candidates $\{Y_{n,j}\}_{j \in N}$ and including candidates that are present in both the first group of candidates $\{X_{n,i}\}_{i \in N}$ and the second group of candidates $\{Y_{n,j}\}_{j \in N}$ in the third group of candidates $\{X_{n,k}\}_{k \in N}$; and g) determining the quality of the signal transmission based on a number of candidates in the third group of candidates $\{X_{n,k}\}_{k \in N}$.

2. The method according to claim 1, wherein determining the quality of the signal transmission comprises determining that the quality of signal transmission is insufficient when the number of candidates of the third group is equal to zero.

3. The method according to claim 1, wherein, for n≥2, the second group of candidates $\{Y_{n,j}\}_{j \in N}$ with j=0, 1, 2, . . . is determined from the candidates $\{X_{n-1,k}\}_{k \in N}$ of the third group determined for index n−1 and using the deterministic algorithm P.

4. The method according to claim 1, wherein the signal occupies all bit positions of a source register of the transmitter device.

5. The method according to claim 1, wherein the signal occupies all bit positions of a source register excluding a set of least significant bits of the source register.

6. The method according to claim 1, wherein
the signal is injected in a main signal to be transmitted from the transmitter device to the receiver device through the communication system,
the signal occupies a part of bit positions of a source register of the transmitter device, and
remaining bit positions of the source register are occupied by the main signal.

7. The method according to claim 6, wherein each bit sequence $X_n$ replaces a set of the least significant bits of the main signal in the source register.

8. The method according to claim 1, wherein determining the first, second and third groups of candidates and determining the quality of the transmission are repeated as long as the third group of candidates includes at least one candidate.

9. The method according to claim 8, wherein, if the third group of candidates includes at least one candidate when all received bit sequences of the signal are received, it is determined that the quality of the signal transmission is good.

10. The method according to claim 1, wherein the first group of candidates $\{X_{n,i}\}_{i \in N}$ is determined according to tolerance information that includes a minimal tolerance value and a maximal tolerance value and, for each received bit sequence $X_n'$, the minimal tolerance value and the maximal tolerance value are calculated from a decimal value of the received bit sequence $X_n'$.

11. The method according to claim 1, wherein determining the quality of the signal transmission comprises determining that the transmitter device and the receiver device are in sync when the third group of candidates has only one candidate.

12. The method according to claim 11, wherein, after the transmitter device and the receiver device are determined to be in sync for an index $n=n_0$, the method proceeds, for each of a plurality of next indices n, with $n > n_0$, with comparing the received bit sequence $X_n'$ and a bit sequence generated from said one candidate and using the deterministic algorithm P in order to find a match.

13. The method according to claim 12, wherein, when no match is found for a number of consecutive indices n exceeding a predetermined value, it is determined that the transmitter device and the receiver device are out of sync.

14. The method according to claim 1, wherein the generated signal is an audio signal in a vehicle architecture.

15. The method according to claim 14, wherein the method is applied during manufacturing of the vehicle or when the vehicle is used.

16. A system for testing a communication signal transmission quality, the system comprising:
a generation unit configured to generate a signal comprising an initial bit sequence $X_0$ and a succession of bit sequences $X_n$ with n=1, 2, . . . , wherein each bit sequence $X_n$ with n≥1 is determined by applying a deterministic algorithm P to a preceding bit sequence $X_{n-1}$ of the signal;
a transmitter device for sending the signal;
a receiver device for receiving the signal as a received bit sequence $X_n'$ for each bit sequence $X_n$ transmitted by the transmitter device, wherein n=0, 1, 2, . . . ; and
a determining unit including at least one processor configured to
determine, for each received bit sequence $X_n'$ with n≥1, a first group of candidates $\{X_{n,i}\}_{i \in N}$ wherein each first group of candidates corresponds to a plurality of possible sent bit sequences $X_{n,i}$ with i=0, 1, 2, . . . modified by a signal modification in the communication system defined by a tolerated and expected error;
determine, for each received bit sequence $X_n'$ with n≥1, a second group of candidates $\{Y_{n,j}\}_{j \in N}$ with j=0, 1, 2, . . . by applying the deterministic algorithm P to the first group off candidates $\{X_{n-1,k}\}_{k \in N}$ from the first group of candidates fora preceding received bit sequence $X_{n-1}'$;
determine a third group of candidates $\{X_{n,k}\}_{k \in N}$ by intersecting the first group of candidates $\{X_{n,i}\}_{i \in N}$ and the second group of candidates $\{Y_{n,j}\}_{j \in N}$ and including candidates that are present in both the first group of candidates $\{X_{n,i}\}_{i \in N}$ and the second group of candidates $\{Y_{n,j}\}_{j \in N}$, in the third group of candidates $\{X_{n,k}\}_{k \in N}$; and
determine the quality of the signal transmission based on a number of candidates in the third group of candidates $\{X_{n,k}\}_{k \in N}$.

17. The system of claim 16, wherein the signal is an audio signal and the system is configured to test the audio quality of an architecture of a vehicle.

18. A non-transitory storage medium including instructions that, when executed by at least one processor, cause the at least one processor to determine a transmission quality of a received signal by
determining, for each received bit sequence $X_n'$ of the received signal with n≥1, a first group of candidates $\{X_{n,i}\}_{i \in N}$ wherein each first group of candidates corresponds to a plurality of possible sent bit sequences $X_{n,i}$ with i=0, 1, 2, . . . modified by a signal modification defined by a tolerated and expected error;
determining, for each received bit sequence $X_n'$ of the received signal with n≥1, a second group of candidates $\{Y_{n,j}\}_{j \in N}$ with j=0, 1, 2, . . . by applying a deterministic algorithm P to the first group of candidates $\{X_{n-1,k}\}_{k \in N}$ from the first group of candidates for a preceding received bit sequence $X_{n-1}'$;
determining a third group of candidates $\{X_{n,k}\}_{k \in N}$ by intersecting the first group of candidates $\{X_{n,i}\}_{i \in N}$ and the second group of candidates $\{Y_{n,j}\}_{j \in N}$ and including candidates that are present in both the first group of candidates $\{X_{n,i}\}_{i \in N}$ and the second group of candidates $\{Y_{n,j}\}_{j \in N}$, in the third group of candidates $\{X_{n,k}\}_{k \in N}$; and determining the quality of the signal transmission based on a number of candidates in the third group of candidates $\{X_{n,k}\}_{k \in N}$.

\* \* \* \* \*